(12) United States Patent
Stephens

(10) Patent No.: US 6,174,138 B1
(45) Date of Patent: Jan. 16, 2001

(54) FLOAT OPERATED DEVICES

(75) Inventor: Dean Jeffrey Stephens, Cheltenham (GB)

(73) Assignee: Spirax-Sargo, Limited, Gloucestershire (GB)

( * ) Notice: Under 35 U.S.C. 154(b), the term of this patent shall be extended for 0 days.

(21) Appl. No.: 09/159,282

(22) Filed: Sep. 22, 1998

(30) Foreign Application Priority Data

Sep. 23, 1997 (GB) .................................................. 9720224

(51) Int. Cl.$^7$ ........................................................ F04F 1/06
(52) U.S. Cl. ........................................... 417/126; 417/132
(58) Field of Search .................................... 417/126, 132, 417/133, 134, 135; 137/409

(56) References Cited

U.S. PATENT DOCUMENTS

| | | | |
|---|---|---|---|
| 1,132,942 | * 3/1915 | Jay | 417/132 |
| 1,542,509 | 6/1925 | Kueny | 417/130 |
| 2,682,887 | 7/1954 | Getz | 137/400 |
| 2,724,433 | * 11/1955 | Witherell | 417/126 |
| 5,141,405 | 8/1992 | Francart | 417/133 |
| 5,445,501 | * 8/1995 | Yumoto | 417/133 |
| 5,655,888 | * 8/1997 | Yumoto | 417/132 |

FOREIGN PATENT DOCUMENTS

| | | |
|---|---|---|
| 0 768 487 A2 | 4/1997 | (EP) . |
| 774592 | 12/1934 | (FR) . |
| 1094278 | 5/1955 | (FR) . |
| 1024287 | 3/1966 | (GB) . |
| 1161255 | 8/1969 | (GB) . |
| 1176187 | 1/1970 | (GB) . |
| 1276704 | 6/1972 | (GB) . |
| 1440365 | 6/1976 | (GB) . |
| 2031556 | 4/1980 | (GB) . |
| 2302916 | 2/1997 | (GB) . |

* cited by examiner

Primary Examiner—Noah P. Kamen
Assistant Examiner—Mahmoud M Gimie
(74) Attorney, Agent, or Firm—Duane, Morris & Heckscher LLP

(57) ABSTRACT

A float operated device such as a pressure powered pump has a chamber 30 in which a float 32 is movable. The float 32 has a low profile form, having an aspect ratio greater than 2. The float operates a toggle mechanism 46 comprising an input lever 34 and an output lever 48 which are pivotable about spaced pivot locations 38, 50. A spring 54 acts between the input and output levers 34 and 48 to provide the toggling action. The toggle mechanism operates a valve arrangement 62.

25 Claims, 7 Drawing Sheets

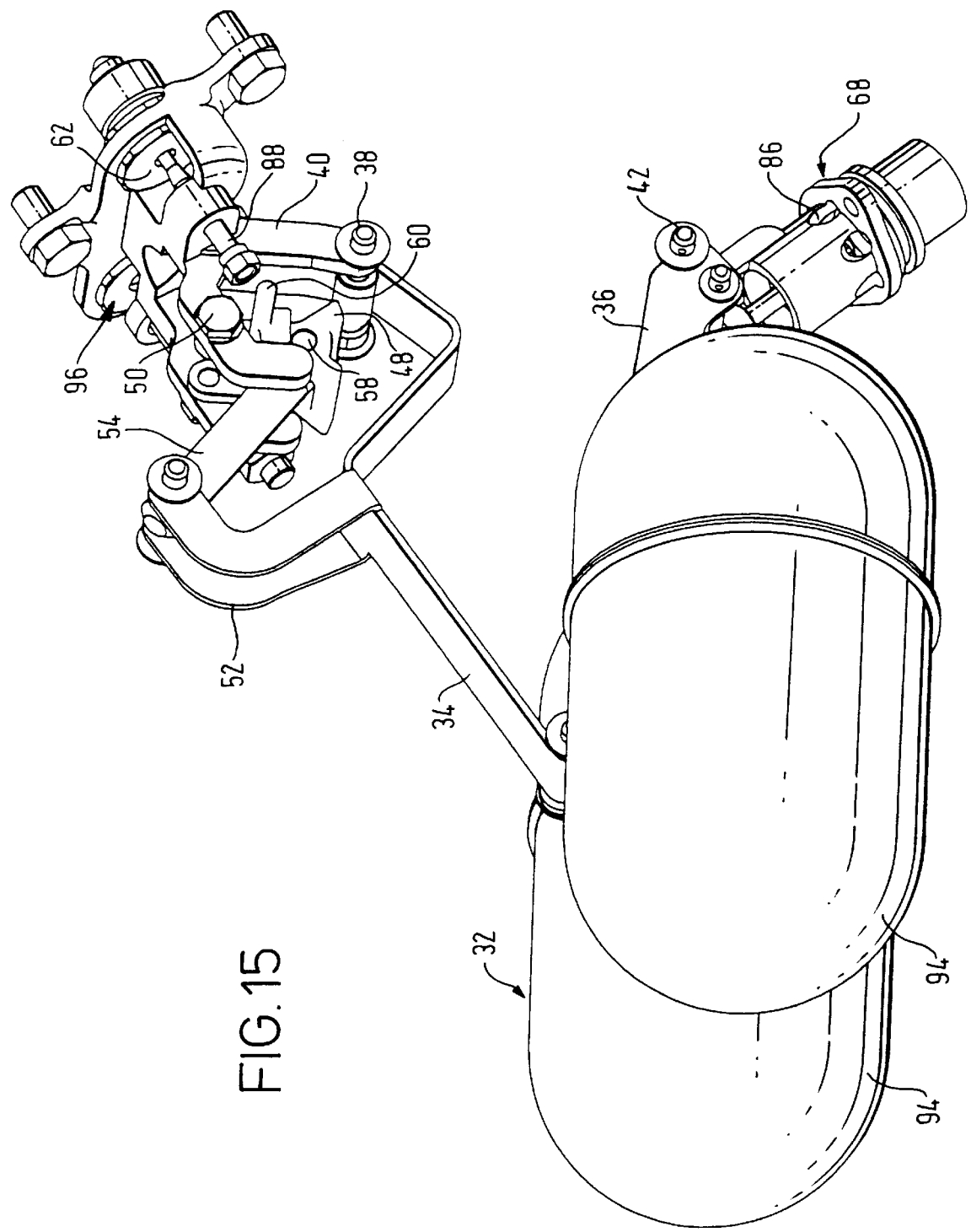

FLOAT OPERATED DEVICES

BACKGROUND OF THE INVENTION AND PRIOR ART

This invention relates to a float operated device which operates at high pressure, such as a pressure powered pump or a condensate trap.

In the context of the present invention, the expression "high pressure" means a pressure in excess of 5 bar and refers to the internal pressure in the housing of the device, to which pressure the float is subjected.

Pressure powered pumps are used in steam systems in order to raise condensate to a condensate return system from which the condensate is reintroduced to the steam generating boiler. Such pumps comprise a chamber in which the condensate accumulates, to be periodically discharged by the periodic admission of steam and venting of the chamber under the control of a float which is responsive to the level of condensate in the chamber. Examples of such pumps are disclosed in GB 2302916 and U.S. Pat. No. 5,141,405.

In some applications, where there is an adequate pressure head at the condensate inlet, the rising float may operate an outlet valve before steam is admitted to the chamber, the condensate then being discharged through the outlet under the pressure at the inlet. If the pressure head is insufficient to discharge the condensate, the float will rise further, and steam will be admitted to the chamber to force the condensate out under pressure.

The pressure powered pump is normally situated at the lowest point in the steam system. It is usually floor-mounted. Sometimes the heat exchanger, or other component of the steam system from which condensate is supplied to the pressure powered pump, is only a small distance above the floor, and consequently the filling head for the pump is too small to produce an adequate filling rate for the pump chamber. It is therefore desirable for the pressure powered pump to operate reliably with a small change in liquid level within the chamber between the end positions of the float. However, in conventional pressure powered pumps which use a spherical float, the diameter of the float itself influences the overall height of the pump chamber. The size of the float itself is dictated by the need to provide adequate buoyancy to operate the toggle mechanism in the rising direction of the float, and adequate weight to operate the toggle mechanism in the reverse direction as the float falls. Spherical floats have conventionally been used in high pressure devices such as pressure powered pumps and condensate traps because a spherical shape is best able to withstand the high pressure to which they are subjected in use.

Another disadvantageous characteristic of known pressure powered pumps is that the toggle mechanism exerts its greatest resistance to movement of the float when the float is at its end positions. This means that substantially the entire buoyancy (or weight) of the float is utilized to overcome the resistance imposed by the toggle mechanism. Consequently, there is no surplus energy which can be utilised to perform other operations, such as the opening of an outlet valve for process fluid.

SUMMARY OF THE INVENTION

According to the present invention there is provided a float operated device comprising a float, capable of withstanding a high pressure, which is supported by a linkage for pivotable movement upwardly and downwardly within a chamber in response to the level of liquid in the chamber, the linkage being connected to actuating means which is operable by movement of the float to actuate control means for controlling the flow into and/or out of the housing, in which device the float has an aspect ratio (as defined herein) which is not less than 2.

In this specification, the expression "aspect ratio" means the ratio of the maximum dimension of the float in the horizontal direction to the maximum direction of the float in the vertical direction. A spherical float as used in the prior art consequently has an aspect ratio of 1. In a device in accordance with the present invention, the aspect ratio preferably lies in the range 2 to 3.5.

A device in accordance with the present invention consequently has a relatively low profile float occupying a small vertical space. This means that the chamber, and consequently the device itself, may be reduced in height by comparison with an equivalent device employing a spherical float.

The float may comprise a single float element having a flattened shape, for example the shape of an oblate spheroid or of a flattened cylinder disposed with its axis vertical. Alternatively, the float may be made up of a plurality of float elements disposed so that the aspect ratio of the float as a whole is not less than 2. For example, the float may comprise a plurality of spherical float elements disposed in a common horizontal plane, possibly in a circular array. In a preferred form, the float may comprise two float elements each in the form of a horizontally disposed cylinder having hemispherical ends, the two float elements lying side-by-side.

The linkage may comprise a parallelogram linkage having two levers which each interconnect the float to a fixed support, one link being connected to the top of the float and the other being connected to the bottom. Such an arrangement provides adequate guidance, orientation and stability to the float. The levers may be cranked to enable them to clear the float when the float is at its end positions.

The actuating means may comprise a toggle mechanism. It may be operatively connected to an operating valve arrangement for controlling the flow of a motive fluid into and out of the chamber. The linkage may be connected to an outlet valve for controlling the flow of liquid to be discharged from the chamber.

In a preferred embodiment, the horizontal projection of the float may have an area which is not less than 50%, and more preferably not less than 60% of the maximum horizontal cross-section of the chamber.

Another aspect of the present invention provides a float operated device having a toggle mechanism which comprises an input lever carrying a float, and an output lever, the levers being pivotably mounted at spaced locations on a common support, and resilient means which acts between a first point on the input lever and a second point on the output lever, the output lever being pivotable between limit positions and the input lever being pivotable between a first position, in which the resilient means acts to bias the output lever into one of its limit positions, a dead point in which the first and second points and the mounting location of the output lever lie on a common straight line, and a second position, in which the resilient means acts to bias the output lever into the other of its limit positions.

In a preferred embodiment constructed in accordance with this aspect of the invention, the force required to displace the input lever from either the first of second position to the dead point increases continuously as the input lever approaches the dead point.

The limit positions of the output lever are preferably defined by stops which are engageable by the output lever.

The input lever may be connected to a float so that the toggle mechanism is float-operated. The output lever may be connected to a valve mechanism.

When used in a float-operated pressure powered pump, the toggle mechanism defined above has the advantage that the initial movement of the float from either of its end positions requires little force, so that the initial movement of the float can be employed, for example, to open an outlet valve for controlling the flow of process liquid from the chamber of the pump.

BRIEF DESCRIPTION OF THE DRAWINGS

FIG. 15 is a perspective view of part of the pump of FIG. 14.

DETAILED DESCRIPTION OF PREFERRED EMBODIMENTS

Figure 1:
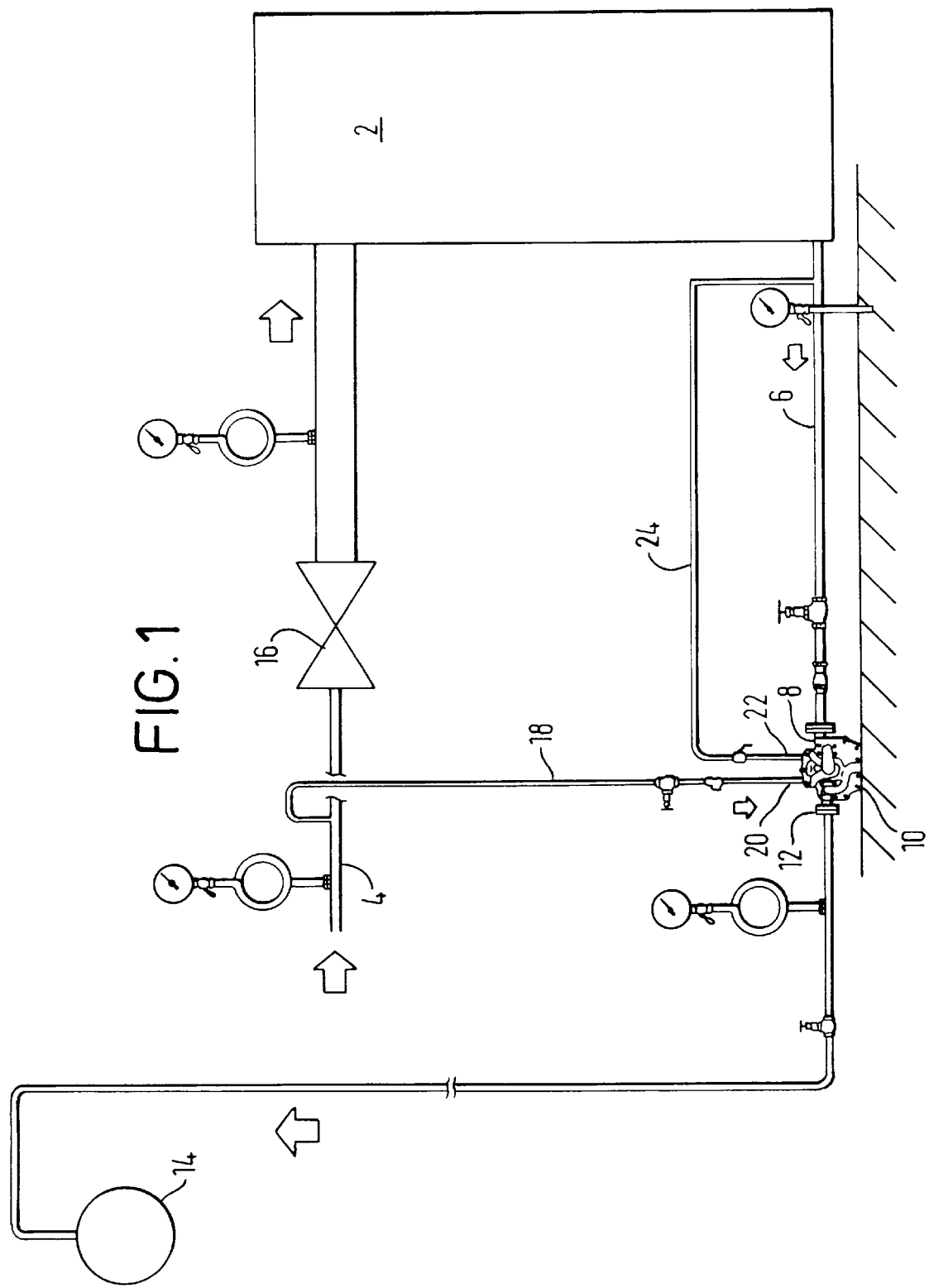
FIG. 1 is a diagrammatic view of a steam system.

The system shown in FIG. 1 comprises steam utilization equipment represented as a heat exchanger 2 which receives process steam passing through a pipe 4 from a steam generating boiler. Heat transfer takes place in the heat exchanger 2, and some of the steam condenses and flows into a condensate pipe 6, which is connected to the condensate inlet 8 of a pressure powered pump 10. The outlet 12 of the pump 10 is connected to a condensate return system 14.

Steam flowing through the pipe 4 is initially at high pressure, but this pressure is reduced by a control valve 16 so that the steam entering the heat exchanger 2 is at a pressure, and therefore temperature, suitable to the process taking place within it. Higher pressure steam at a pressure of at least 5 bar, for example in excess of 8 bar, is taken from the pipe 4 through a pipe 18 to a motive steam inlet 20 of the pump 10. An exhaust port 22 of the pump 10 is connected by a balance pipe 24 to the pipe 6.

In operation, steam flowing through the pipe 4 to the heat exchanger 2 gives up its heat and condenses. The condensate flows through the pipe 6 to the pump 10. If the pressure in the pipe 6 is sufficient to raise the condensate to the condensate return system 14, then the pump 10 will operate as a steam trap, opening in response to the presence of condensate and closing if only steam reaches the condensate inlet 8. However, if the pressure in the pipe 6 is insufficient to drive the condensate to the return system 14, then motive steam from the pipe 4 is admitted to the pump 10 through the pipe 18 to operate the pump to displace the condensate.

The pump is shown in greater detail in FIGS. 2 to 6. The pump comprises a housing 26 having an end cap 28 which between them define a chamber 30. A float 32 is situated within the chamber 30 and is supported by a parallelogram linkage comprising an upper lever 34 and a lower lever 36. The upper lever 34 is connected at a pivot location 38 to a support 40 which is secured to the end cap 28. Similarly, the lower lever 36 is mounted at a pivot location 42 on a support 44 which is also secured to the end cap 28.

The upper lever 34 serves as the input lever of a toggle mechanism 46. The mechanism 46 has an output lever 48 which is pivotably connected to the support 40 at a pivot location 50 which is spaced from the pivot location 38. The lever 34 has an arm 52, and a tension spring 54 acts between a first point 56 at the outer end of the arm 52, and a second point 58 on the output lever 48 at a position away from the pivot location 50.

The output lever 48 carries an operating pin 60 for operation of a motive steam inlet valve 62 which controls the flow of steam from the pipe 18 through the inlet 20.

The condensate inlet 8 is controlled by a flap valve 64 which cooperates with a seat 66. This valve is shown in greater detail in FIGS. 8 and 9. It will be appreciated from FIGS. 2 to 6 that the seat 66 is inclined with respect to the vertical. The flap valve has a circular main body 63, with an integrally formed pivot shaft 65 at its upper edge. The pivot shaft 65 extends tangentially of the main body and is retained at each end in respective gaps between the end cap 28 and the support 40, so that the main body 63 can swing into and out of contact with the seat 66 in response to the pressure difference between the chamber 30 and the inlet 8.

Figure 7:
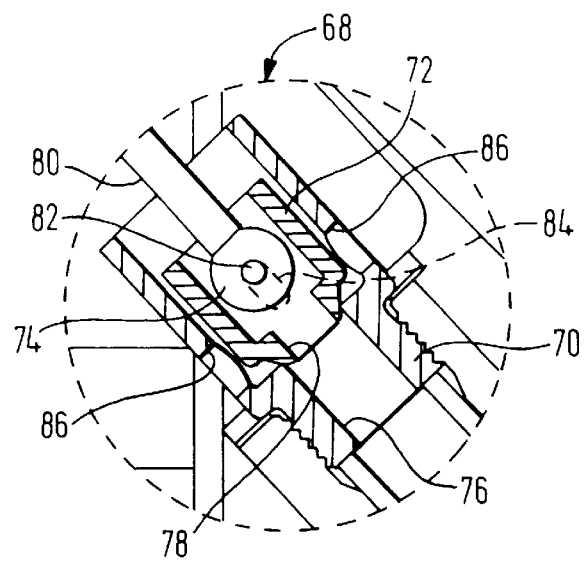
FIG. 7 is an enlarged view of a condensate outlet valve of the pump of FIGS. 2 to 6.

The lower lever 36 is connected to an outlet valve 68 for controlling the flow of liquid through the condensate outlet 12. The valve 68 is shown in greater detail in FIG. 7 and comprises a valve seat 70, an outer valve element 72 and an inner valve element 74. The valve seat 70 has a central bore 76, and the outer valve element 72 is movable into and out of sealing engagement with this bore 76. The outer valve element 72 has an opening 78, and the inner valve element 74 is movable into and out of contact with this opening 78. The inner valve element 74 is mounted on a stem 80 which is pivotably connected to the lever 36. The inner valve element 74 has a transverse pin 82 which engages in a longitudinally extending slot 84 formed in the outer valve element 72. Consequently, it will be appreciated that movement of the stem 80 in the upwards direction as shown in FIG. 7 will initially move the inner valve element 74 out of contact with the opening 78, so permitting restricted flow through the valve. Continued movement of the stem 80 will cause the pin 82 to engage the upper end of the slot 84 (the condition shown in FIG. 7), and subsequently will cause the outer valve element 72 to be withdrawn from the bore 76, permitting full flow through the bore 76 by way of passages 86 formed in the valve seat 70.

Figure 2:
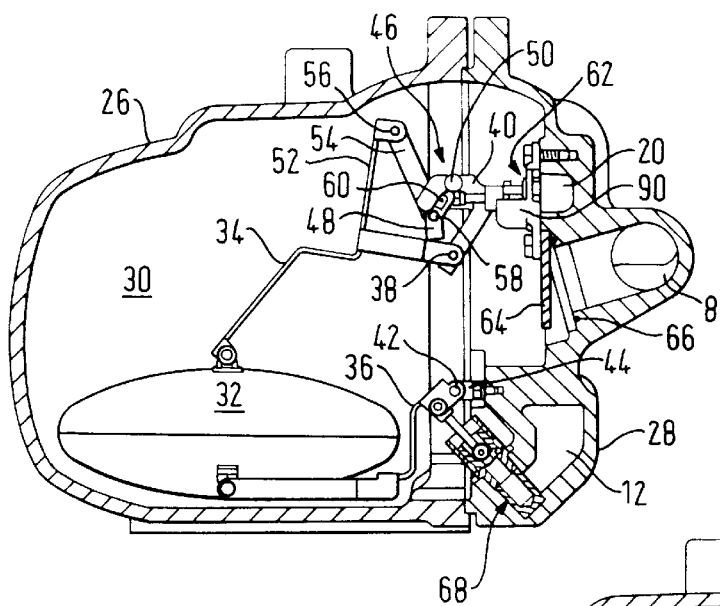
FIGS. 2 to 6 are cross-sectional views of a pressure powered pump used in the system of FIG. 1, shown at different stages of operation.

FIG. 2 shows the pump in the condition in which no condensate is present in the chamber 30. Consequently, the float 32 is at its lowermost position. The valve 62 is closed and a corresponding valve (not shown in FIGS. 2 to 6 but visible at 96 in FIG. 13) controlling the exhaust port 22 is open. Consequently, the pressure within the chamber 30 is the same as that at the condensate inlet port 8. The flap valve 64 hangs vertically so that any condensate flowing from the steam jacket from the heat exchanger 2 can pass (under gravity) into the chamber 30 without any pressure drop caused by a need to open the valve. The valve 68 is fully closed.

Figure 3:
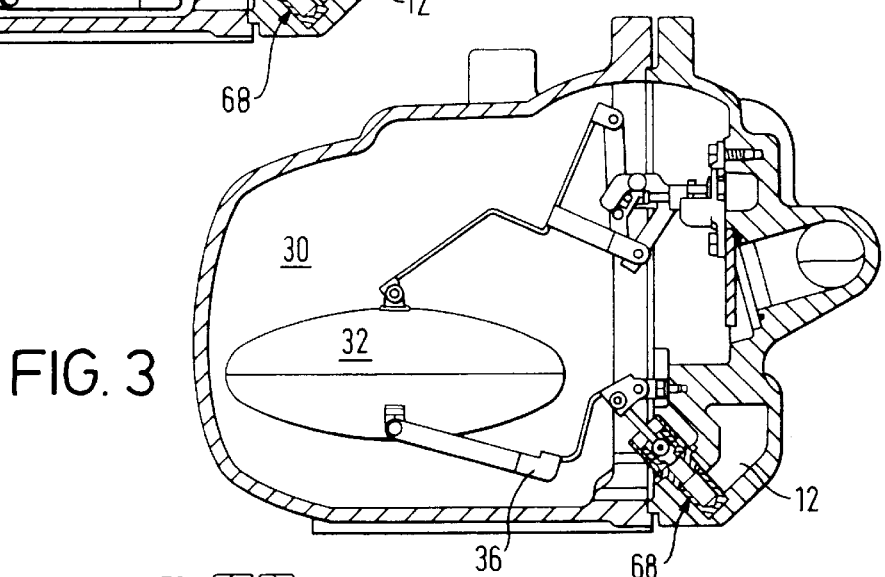

FIG. 3 shows the condition in which the chamber 30 has begun to fill with condensate. The float 32 has risen, causing the lower lever 36 to act on the stem 80 of the valve 68 to withdraw the inner valve element 74 from the opening 78. In this condition, condensate is free to flow through the valve 68 through the condensate outlet 12 to the condensate return system 14. However, this will happen only if the pressure in the chamber 30 (which is equivalent to that at the inlet 8) is sufficient to raise the condensate to the level of the condensate return system 14 A non-return valve may be provided in the valve 68 to prevent backflow into the chamber 30.

Figure 4:
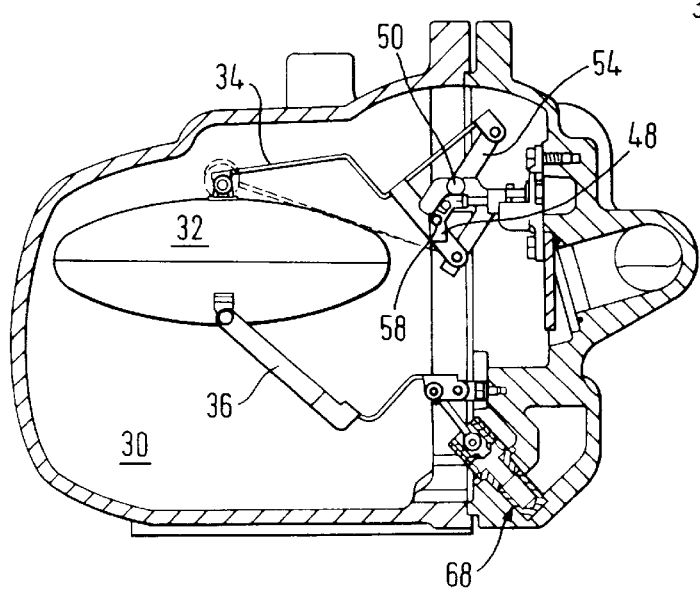

If condensate continues to flow into the chamber 30 through the condensate inlet 8 at a rate faster than any outflow through the valve 68, the float 32 will continue to rise, as shown in FIG. 4. In this condition, the lever 36 has caused the valve 68 to open fully, while the associated pivoting movement of the lever 34 has caused the spring 54 to move to a position in which the line passing through its two ends also passes through the pivot location 50 of the output lever 48.

Figure 6:
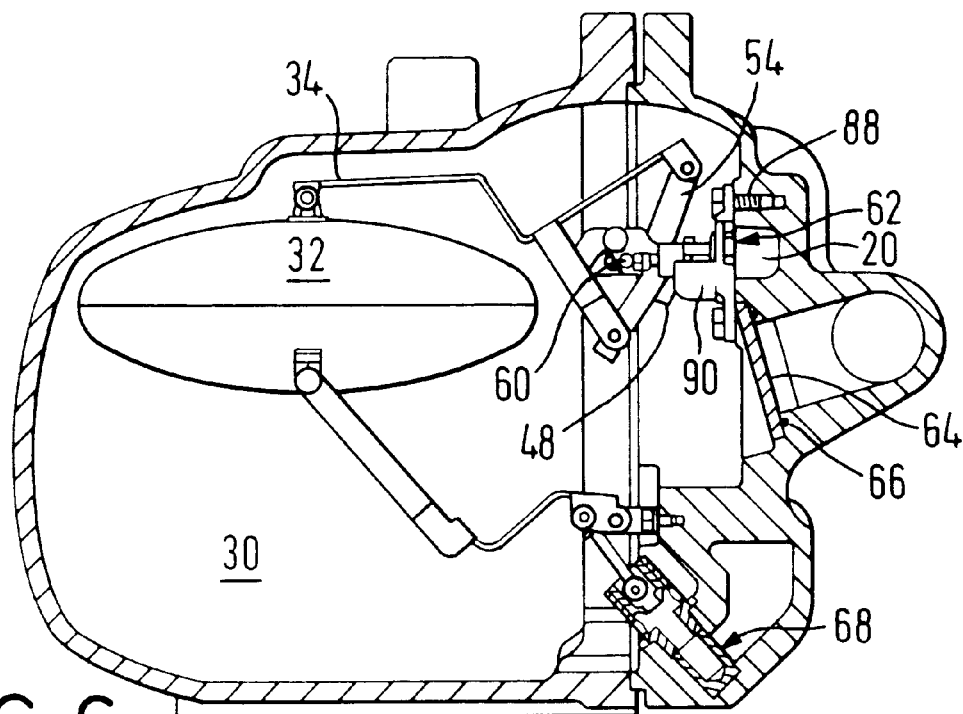

FIG. 6 shows the condition in which the float 32 is in its uppermost position. In this condition, the spring 54 has moved beyond the in-line condition of FIG. 4, and consequently the toggle mechanism has switched, causing the output lever 48 to snap over rapidly to its other limit position. This causes the operating pin 60 to strike the actuating element 88 of the valve 62 so opening the motive steam inlet 20; at the same time, the exhaust 22 is closed. Steam rushes in through the motive steam inlet 20 to pressurize the chamber 30. This causes the flap valve 64 to close against the seat 66, and the increased pressure in the chamber 30 forces the condensate to be driven out through the fully open valve 68.

Figure 5:
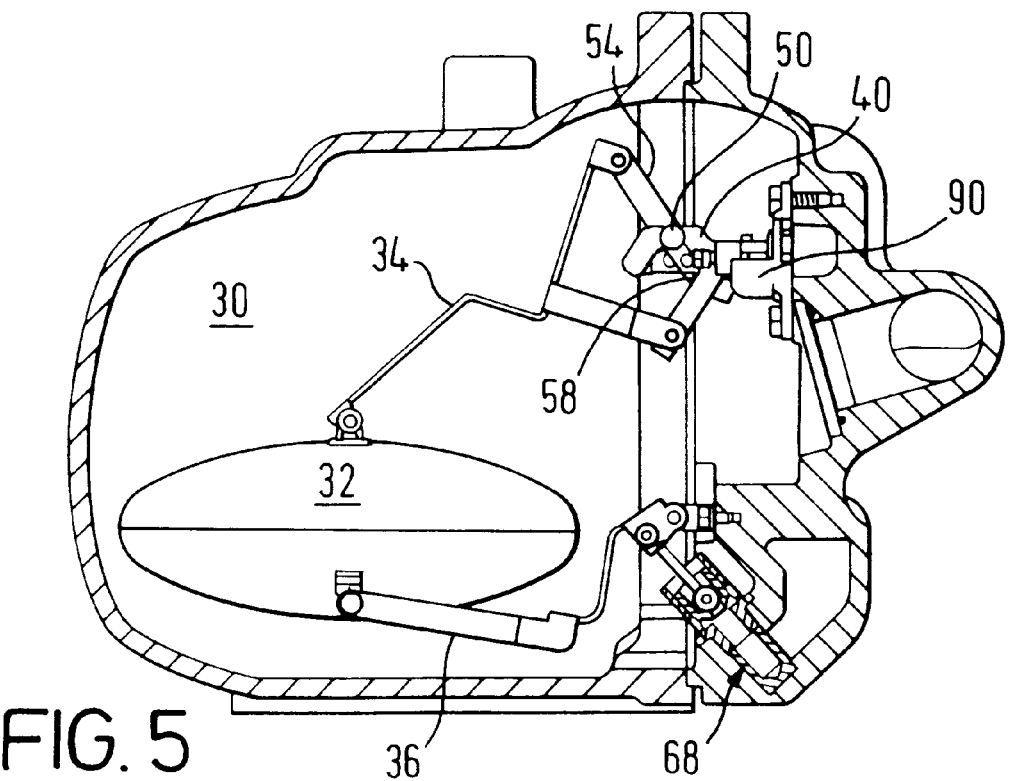

As the condensate level in the chamber 30 falls, it takes the float along with it, and the resulting movement of the upper lever 34 turns the spring 54 about its pivot point 58 on the output lever 48 until, as shown in FIG. 5, the line connecting the two ends of the spring 54 passes through the pivot location 50 at which the output lever 48 is connected to the support 40. In this condition, the float 32 is close to the bottom of the chamber 30, and continued downward movement of the float will cause the toggle mechanism 46 to snap over again to assume the condition as shown in FIG. 2, in which the motive steam inlet 20 is closed and the exhaust 22 is open. Similarly the lower lever 36 has caused the valve 68 to return to the fully closed position.

As shown in FIGS. 2 to 6, a deflector 90 is fitted to the end cap 28 around the motive steam inlet 20. The purposes of this deflector 90 is to ensure that steam entering the chamber 30 is deflected upwardly away from the surface of condensate in the chamber 30 to avoid forced mixing of the steam and condensate. This delays the cooling, and consequent condensation, of the steam so that the pressure within the chamber 30 is maintained as the condensate is discharged through the valve 68.

In the embodiment shown in FIGS. 2 to 6, the float is in the form of an oblate spheroid, or flattened sphere. As viewed in a vertical direction, the profile of the float 32 is circular and there is only a relatively small clearance between the outer periphery of the float 32 and the wall of the chamber 30. This minimizes the free surface of condensate in the chamber 30 which further reduces heat exchange between the incoming motive steam and the condensate.

In the embodiment shown in FIGS. 2 to 6, the aspect ratio of the float 32 is approximately 2.4. Preferably, the aspect ratio is less than 3.5, since it becomes increasingly difficult to design hollow floats with larger aspect ratios which are capable of withstanding the pressures which are likely to prevail in a pressure powered pump. Additional strength can be imparted by providing strengthening elements, such as honeycomb structures, within the float. Apart from the strength requirements, it is also necessary for the buoyancy and weight of the float to be sufficient to trip the toggle mechanism on both the upwards and downwards stroke of the float 32.

Figure 8:
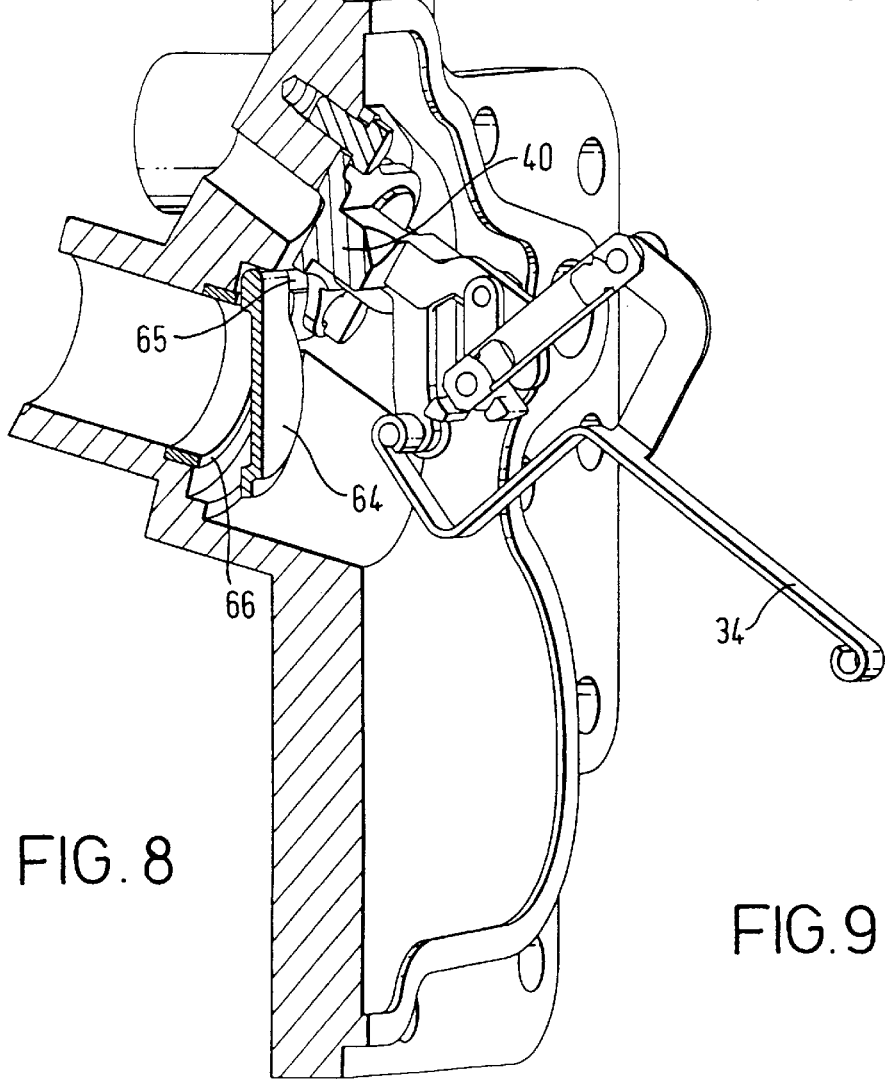
FIG. 8 is a sectioned view of part of the pump of FIGS. 2 to 10.
Figure 9:
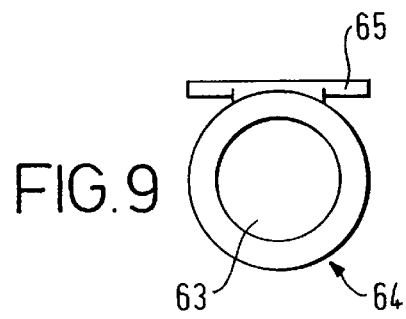
FIG. 9 is a view of a component of the part shown in FIG. 8.
Figure 10:
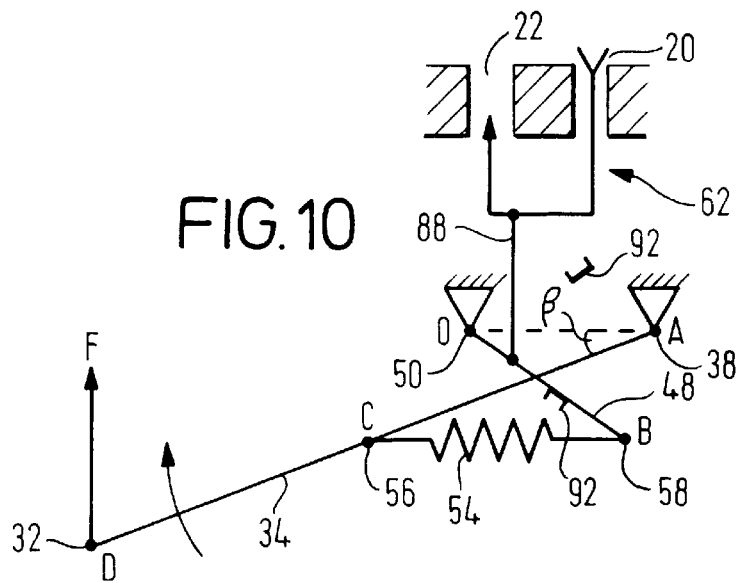
FIGS. 10 to 12 diagrammatically represent a toggle mechanism of the pump of FIGS. 2 to 6 in different stages of operation.

It will be appreciated from FIGS. 2 and 6 that the levers 34 and 36 are cranked to accommodate the float 32 in its end positions. The operation of the toggle mechanism is represented in FIGS. 8 to 10, in which the various components have been represented using the same reference numerals as for the corresponding components in FIGS. 2 to 6. In addition, stops 92 are shown for arresting the motion of the output lever 48.

FIG. 8 represents the condition shown in FIG. 2. The output lever 48 abuts the lower stop 92 and consequently upward movement of the float 32 is resisted by the spring 54.

As the condensate level in the chamber 30 rises, the buoyancy of the float 32 overcomes the forces applied by the spring 54 at point C (56) and so the lever 34 rotates about the fixed point A (38). At the dead point, shown in FIG. 9, the points C (56), O (50) and B (58) lie on a common straight line but nevertheless it will be appreciated that, assuming the output lever 48 were to remain fixed in position, continued upwards movement of the float 32 would cause further extension of the spring 54. This is the result of the points O (50) and A (38) being separate from one another, because the movement of the point C (56) still has a component of direction away from point B (58).

FIG. 10 shows the condition immediately after that of FIG. 9, in which the toggle mechanism has switched over, with the lever 48 snapping over into abutment with the upper stop 92.

Figure 11:
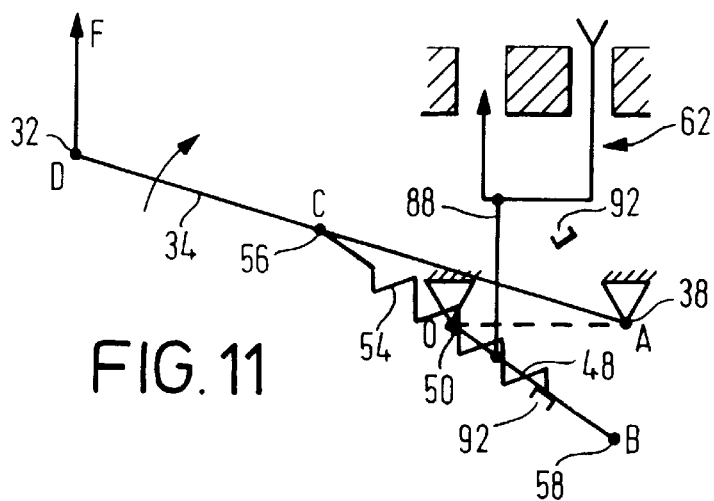

By arranging for the pivot locations 0 (50) and A (38) to be at different positions means that the toggle mechanism can be set up so that the buoyancy force required to raise the float 32 against the action of the spring 54 starts from a very low value, since the initial movement of the point C (56) is substantially perpendicular to the direction of the spring 54 (see FIG. 2). Consequently, since the upwards movement of the float 32 is initially hardly resisted at all by the spring 54, all of the energy available from the movement of the float 32 can be applied to opening the valve 68 by lifting the inner valve element 74 from the opening 78. As the float continues to rise, the force needed to overcome the spring 54 gradually increases, and continues to increase until the dead point of the toggle mechanism. This is represented graphically by FIG. 11, in which A represents the lowest position of the float 32, and B represents the dead point of the toggle mechanism. This arrangement thus enables optimisation of the use of the energy available from the displacement of the float 32 to ensure reliable opening of the valve 68 and a reliable toggling action of the mechanism 46 with a relatively short overall float movement. This arises because the pivoting of the levers 3 and 48 occurs about separate pivots 38 and 50, creating a relatively large movement of the end 56 of the spring for a relatively short movement of the float 32.

Figure 12:
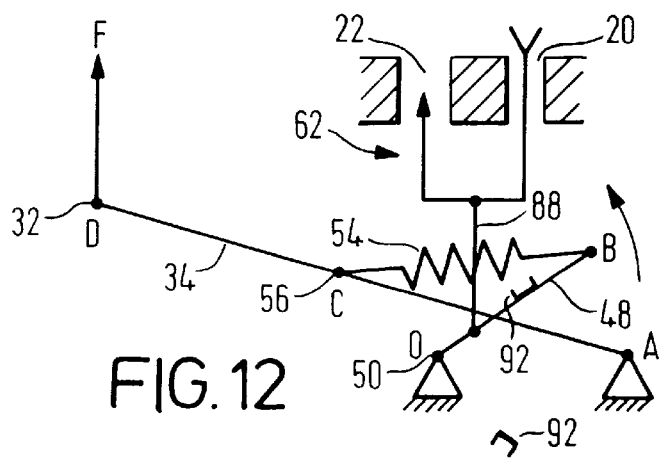
Figure 13:
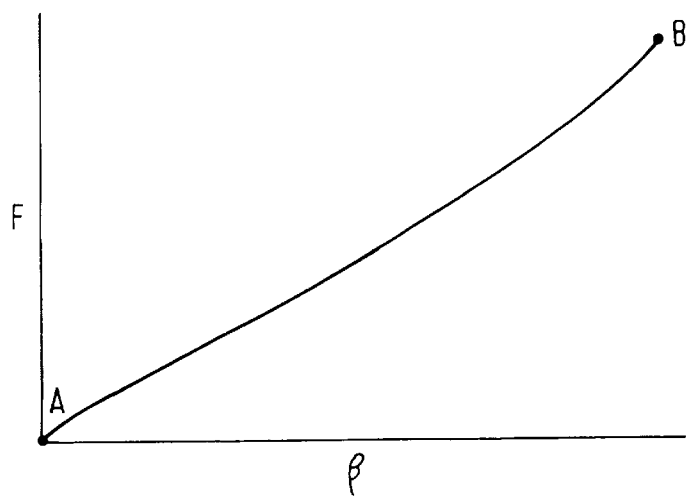
FIG. 13 is a graph representing the operation of the toggle mechanism of FIGS. 10 to 12.
Figure 14:
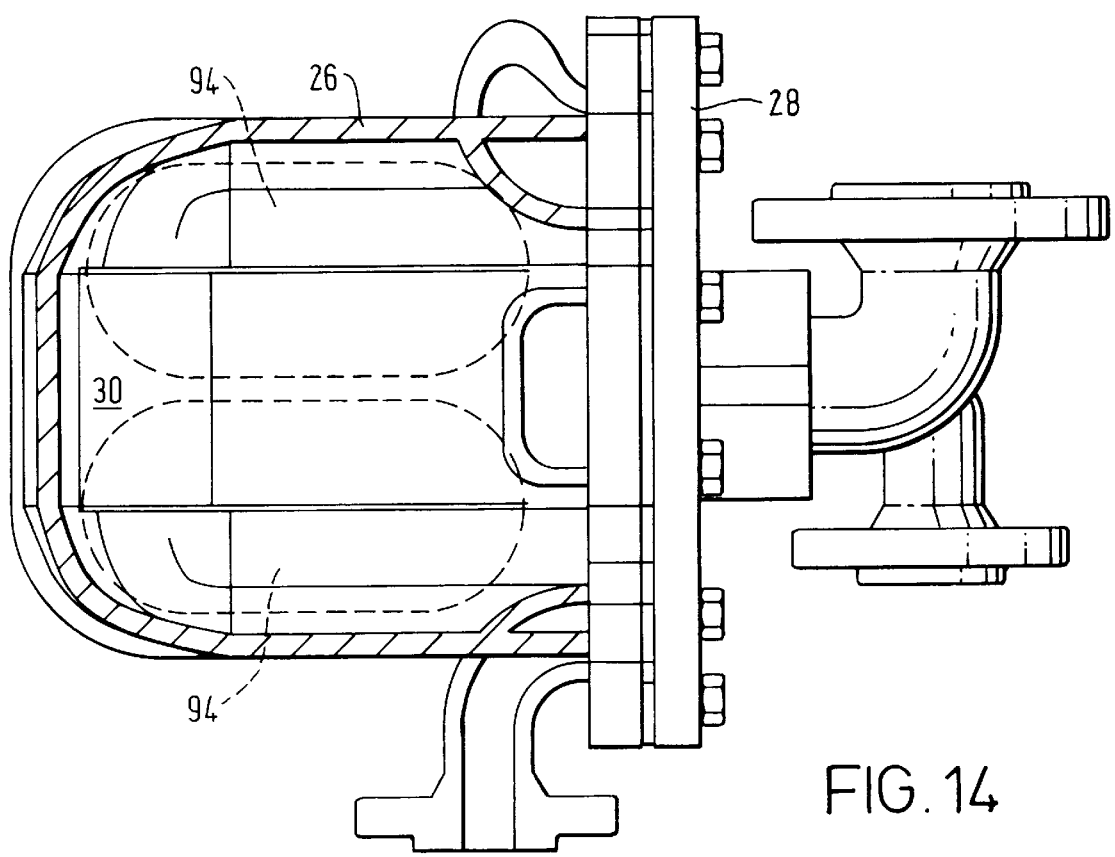
FIG. 14 is a cross-sectional plan view of an alternative form of pressure operated pump.

FIGS. 12 and 13 show an alternative structure for the float 32. In this embodiment, the float is made up of two float elements 94 which are rigidly connected together. Each float element is in the form of a cylinder having hemispherical ends. These float elements are disposed side-by-side with their longitudinal axes parallel to each other and lying in a horizontal plane. It will be appreciated from FIG. 12 that, as mentioned above, the float 32 as a whole occupies a substantial proportion of the cross-sectional area of the chamber 30, so that the free surface of condensate is kept to a minimum to minimize heat exchange between the condensate and the incoming steam during a pumping cycle.

The pressure powered pumps described above can be constructed with a relatively low profile as a result of the use of a low aspect ratio float. Also, since the condensate inlet valve 66 (and possibly any outlet non-return valve incorporated in the valve 68) are provided within the end cap 28, there is no need for separate non-return valves to be installed on each side of the pump.

Another advantage of the pumps described above is that all working parts are mounted on the end cap 28, making servicing simpler.

Although the present invention has been described with reference to a pressure powered pump, it will be appreciated that it is also applicable to other high pressure float operated devices such as condensate traps.

I claim:

1. A float operated device comprising
   a chamber,
   control means for controlling flow of process liquid into and/or out of the chamber,
   actuating means adapted to actuate the control means,
   a float disposed within the chamber, and a linkage which is connected to the actuating means and which supports the float for pivotable movement upwardly and downwardly within the chamber in response to the level of liquid in the chamber, whereby
   the control means is operated in response to movement of the float, wherein the float comprises a single float element in the form of an oblate spheroid which is capable of withstanding a pressure within the chamber in excess of 5 bar and has an aspect ratio (as defined herein) which is not less than 2.

2. A device as claimed in claim 1, in which the aspect ratio is not greater than 3.

3. A device as claimed in claim 1, in which the linkage comprises a parallelogram linkage comprising two levers which interconnect the float and a fixed support.

4. A device as claimed in claim 3, in which the levers are cranked.

5. A device as claimed in claim 1, in which the actuating means comprises a toggle mechanism.

6. A device as claimed in claim 1, in which the actuating means is operatively connected to a valve arrangement for controlling the flow of a motive fluid into and out of the chamber.

7. A device as claimed in claim 1, in which the linkage is operatively connected to an outlet valve for controlling the flow of process liquid from the chamber.

8. A device as claimed in claim 1, in which a normally open check valve is provided at a process liquid inlet of the chamber, the check valve being closable under pressure within the chamber.

9. A device as claimed in claim 1, in which the horizontal projection of the float has an area which is not less than 60% of the maximum horizontal cross-sectional area of the chamber.

10. A float operated device comprising a float and having a toggle mechanism which comprises
    a common support
    an input lever which carries the float,
    an output lever which is pivotable between limit positions, the levers being pivotably mounted at spaced locations on the common support,
    resilient means which acts between a first point on the input lever and a second point on the output lever,
    the input lever being pivotable between a first position, in which the resilient means acts to bias the output lever into one of its limit positions, a dead point in which the first and second points and the mounting location of the output lever lie on a common straight line, and a second position, in which the resilient means acts to bias the output lever into the other of its limit positions.

11. A mechanism as claimed in claim 10, in which the force required to move the input lever from its first or second position to the dead point increases continuously as the input lever moves from the first or second point to the dead point.

12. A device as claimed in claim 10, in which the limit positions of the output lever are defined by stops which are engageable by the output lever.

13. A device as claimed in claim 10, in which the output lever is operably connected to a valve mechanism.

14. A float operated device comprising
    a chamber,
    control means for controlling flow of process liquid into and/or out of the chamber,
    actuating means adapted to actuate the control means,
    a float disposed within the chamber, and
    a linkage which is connected to the actuating means and which supports the float for pivotable movement upwardly and downwardly within the chamber in response to the level of liquid in the chamber, whereby the control means is operated in response to movement of the float, wherein the float comprises a plurality of interconnected float elements, each float element of the float being capable of withstanding a pressure within the chamber in excess of 5 bar and wherein the float has an aspect ratio (as defined herein) which is not less than 2.

15. A device as claimed in claim 14, in which the float comprises two float elements, each comprising a cylindrical body with hemispherical ends.

16. A device as claimed in claim 15, in which the float elements are disposed with their longitudinal axes parallel to each other.

17. A device as claimed in claim 15, in which the float elements are disposed with their longitudinal axes generally horizontal.

18. A device as claimed in claim 14, in which the aspect ratio is not greater than 3.

19. A device as claimed in claim 14, in which the linkage comprises a parallelogram linkage comprising two levers which interconnect the float and a fixed support.

20. A device as claimed in claim 14, in which the levers are cranked.

21. A device as claimed in claim 14, in which the actuating means comprises a toggle mechanism.

22. A device as claimed in claim 14, in which the actuating means is operatively connected to a valve arrangement for controlling the flow of a motive fluid into and out of the chamber.

23. A device as claimed in claim 14, in which the linkage is operatively connected to an outlet valve for controlling the flow of process liquid from the chamber.

24. A device as claimed in claim 14, in which a normally open check valve is provided at a process liquid inlet of the chamber, the check valve being closable under pressure within the chamber.

25. A device as claimed in claim 14, in which the horizontal projection of the float has an area which is not less than 60% of the maximum horizontal cross-sectional area of the chamber.

* * * * *

UNITED STATES PATENT AND TRADEMARK OFFICE
CERTIFICATE OF CORRECTION

PATENT NO.    :    6,174,138
DATED         :    January 16, 2001
INVENTOR(S)   :    Dean Jeffrey Stephens It is certified that error appears in the above-identified patent and that said Letters Patent is hereby corrected as shown below:

Cover page, first column, line 5 after [73] Assignee: Spirax-Sargo, Limited, Gloucestershire, GB, insert – Spirax-Sarco, Limited, Gloucestershire, GB –.

Signed and Sealed this

Twenty-ninth Day of May, 2001

Attest:

NICHOLAS P. GODICI

*Attesting Officer*    *Acting Director of the United States Patent and Trademark Office*

UNITED STATES PATENT AND TRADEMARK OFFICE
CERTIFICATE OF CORRECTION

PATENT NO.    : 6,174,138 B1
DATED         : January 16, 2001
INVENTOR(S)   : Dean Jeffrey Stephens It is certified that error appears in the above-identified patent and that said Letters Patent is hereby corrected as shown below:

<u>Title page,</u>
Item [73], Assignee: delete "Spirax-Sargo, Limited," and insert
-- Spirax-Sarco, Limited, Gloucestershire, GB --.

Signed and Sealed this

Sixth Day of August, 2002

Attest:

JAMES E. ROGAN
Attesting Officer        Director of the United States Patent and Trademark Office